United States Patent [19]

Hartmann

[11] 4,006,642
[45] Feb. 8, 1977

[54] APPARATUS FOR A MULTI-PART INJECTION MOLD FOR MEASURING THE DEGREE OF FILLING OF THE HOLLOW MOLD COMPARTMENT OR THE CLOSURE PRESSURE OF THE MOLD

[75] Inventor: Eduard Hartmann, Urdorf, Switzerland

[73] Assignee: Bucher-Guyer AG, Niederweningen, Switzerland

[22] Filed: Feb. 18, 1975

[21] Appl. No.: 550,472

[30] Foreign Application Priority Data

Feb. 26, 1974 Switzerland .................. 2731/74

[52] U.S. Cl. .................. 73/432 R; 425/145
[51] Int. Cl.² .................. G01P 13/00; B29G 3/00
[58] Field of Search ......... 73/432 R; 425/145, 149, 425/150, 171, 147

[56] References Cited

UNITED STATES PATENTS

| | | | |
|---|---|---|---|
| 3,773,451 | 11/1973 | Bielfeldt | 425/147 |
| 3,859,400 | 1/1975 | Ma | 425/145 |

*Primary Examiner*—Richard E. Aegerter
*Assistant Examiner*—Willis Little
*Attorney, Agent, or Firm*—Werner W. Kleeman

[57] ABSTRACT

A measuring apparatus for a multi-part injection mold for measuring the degree of filling of the hollow mold compartment with plastic material or the closure pressure of the mold comprising a distance measuring transmitter coupled with one part of the mold and responsive to changes in the mold gap formed between the one mold part and another mold part. The coupling location of the distance measuring transmitter at the one mold part is arranged in spaced relationship from the separation or parting plane of the mold.

8 Claims, 2 Drawing Figures

APPARATUS FOR A MULTI-PART INJECTION MOLD FOR MEASURING THE DEGREE OF FILLING OF THE HOLLOW MOLD COMPARTMENT OR THE CLOSURE PRESSURE OF THE MOLD

BACKGROUND OF THE INVENTION

The present invention relates to a new and improved construction of measuring apparatus for a multi-part injection mold for measuring the degree of filling of the hollow mold compartment with plastic material injected therein or the closing or closure pressure of the mold and comprises a distance measuring transmitter coupled at one mold part and responsive to changes in the mold gap formed between said one mold part and another mold part.

It has already been proposed to the art in the case of injection molding machines for the processing of plastic or synthetic materials which can be plasticized to correlate the automatic regulation of different magnitudes influencing the degree of filling of the mold, such as for instance the injection pressure, the post-pressure, the dosing volume of the hardening time, to the circumstance that during the injection process under the action of the molding mass injected at high pressure there occurs between two mold parts a relative movement in the sense of opening the mold and thus there can form a more or less large mold gap.

In order to prevent the formation of a much too large flash or seam at the molded article it should be appreciated that the mold gap at the mold parting or separation plane must be small in size. On the other hand, it has been found that in the case of measuring devices utilizing a contactless distance measuring transmitter, especially working on an inductive basis, and which transmitter responds to changes in the size of the mold gap, both the measuring sensitivity and the measuring range are too small when there should not be exceeded an acceptable dimension or size at the mold gap.

SUMMARY OF THE INVENTION

Hence, it is a primary object of the present invention to provide an improved measuring apparatus at a multi-part injection mold for measuring the degree of filling of the hollow mold compartment or the closing pressure of the mold in a manner not associated with the drawbacks and limitations of existing prior art proposals.

Another and more specific object of the invention is directed towards enlarging the measuring range of such measuring devices in a manner such that in the end phase of the filling operation, however, prior to the formation of a mold separation gap, there is sensed or registered a measurement value influenced by the degree of filling of the mold compartment with the injection molded material, typically plastic.

Still a further object of the invention is concerned with the provision of apparatus for a multi-part injection mold for measuring the degree of filling of the mold compartment with plastic material or the closing pressure of the mold by employing a distance measuring transmitter arranged in the mold which is responsive to decompression of the mold i.e. the forces exerted by the injection molded material opposing the mold closing force and in any event to bending of the mold at the region of the mold compartment, with the useful response of the transmitter positively occurring prior to the formation of a mold gap at the mold separation or parting plane.

Now in order to implement these and still further objects of the invention, which will become more readily apparent as the description proceeds, the invention contemplates the provision of a measuring device of the previously mentioned type which is manifested by the features that the coupling location of the distance measuring transmitter is arranged in spaced relationship from the mold parting or separation plane. Owing to this arrangement the measurement path of the distance measuring transmitter is no longer limited to the mold gap rather encompasses the distance between the mold parting or separation plane and the coupling location, so that the distance measuring transmitter is capable of detecting measuring changes which arise within its enlarged measurement path, even prior to the formation of the mold gap, in that the material mass of the mold which is compressed by the closing pressure again relaxes under the action of the high injection pressure prevailing at the terminal or end phase of the filling operation. Stated in another way, the distance measuring transmitter is responsive to measurement changes which arise when the mass of material from which the mold is formed, and which mold material mass is compressed during the closing of the mold, again relaxes or returns to its original essentially non-compressed state under the action of the high injection molding pressure prevailing in the final phase of injection of the plastic molding material due to this high pressure of the injected plastic material in the mold compartment opposing the closing force applied to the mold and which closing force previously compressed the material from which the mold is formed. Consequently, rather than having to wait until there is formed an undesired mold gap at the mold parting or separation plane, the distance measuring transmitter is already able to sense measurement changes arising at such time when the injection molding material at the end of the injection step starts to oppose the mold closing force and also when there arises bending-through of the mold at the region of the mold compartment, but in any case before there is actually formed any mold gap at the mold parting plane.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
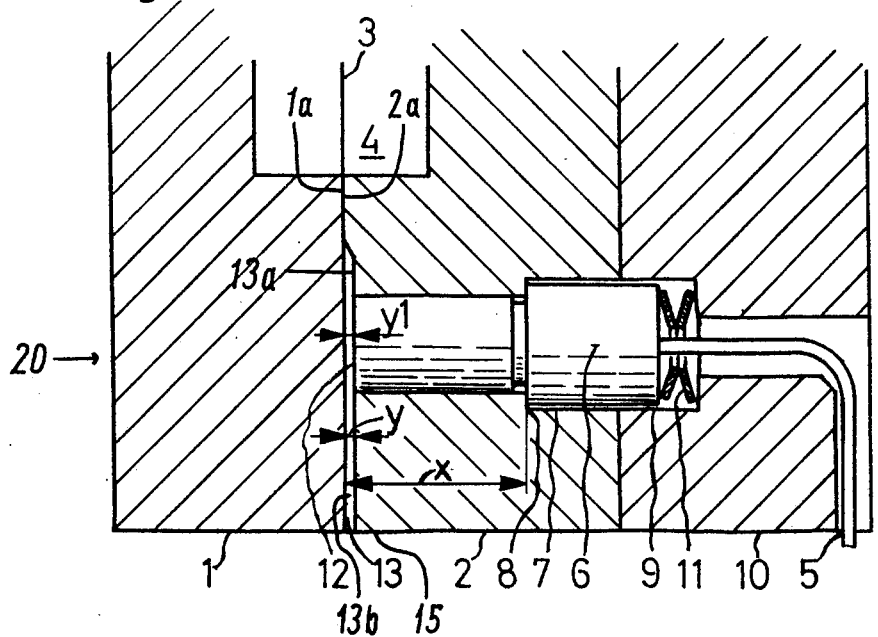
FIG. 1 is a vertical sectional view of a multi-part mold equipped with a distance measuring transmitter mounted therein as contemplated by the invention.

Describing now the drawing, in FIG. 1 there is depicted a mold 20 composed of both mold parts or halves 1 and 2 in its closed position, wherein such mold parts 1 and 2 bear against one another at their separation or parting surfaces 1a and 2a respectively, at the so-called mold separation or parting plane 3. The cooperating mold halves 1 and 2, in the illustrated closed position of the mold, form a hollow mold compartment 4. As is well known in this art the molding material, typically plastic, is injected at high pressure into the mold compartment 4 in conventional manner, wherefore the infeed means and other parts of the molding equipment not necessary for understanding the underlying concepts of the invention have been conveniently omitted from the drawing for purposes of simplifying the illustration.

A conventional inductive distance measuring or measurement transmitter or transducer 6, which is connected through the agency of a measuring line or conductor 5 with a standard and therefore not particularly illustrated regulation device not forming part of the invention, is located in a stepped bore 7 of the mold part or half 2, this bore 7 having a contact surface in the form of a shoulder 8 which, as will be explained more fully hereinafter, defines the so-called coupling or connection location for the distance measuring transmitter 6 with such mold half or part 2. Plate springs 11 or equivalent means which are inserted in a blindhole bore 9 of a mold support plate 10 serve to press the displaceable distance measuring transmitter 6 against the shoulder 8, so that an end face or surface 12 of the aforesaid distance measuring transmitter 6 is flush with the surface 13a of a recess 13 of the mold half 2, this recess 13 forming an intermediate space 13b between both mold halves 1 and 2 when the mold is closed. The recess 13, possessing a groove-like shape, is at least as wide as the end face 12 of the distance measuring transmitter 6 and it extends up to the lower marginal region 15 of the mold half 2, as best seen by referring to FIG. 1.

During the filling operation, i.e. when the plastic material is injected into the hollow mold compartment 4, there occur changes of the mold 20 due to the action of the pressure which prevails in the hollow mold compartment 4, this pressure being exerted by the injected plastic material. Such changes of the mold 20 will be conveniently collectively referred to as so-called mold breathing. In the diagram portrayed in FIG. 2 the mold breathing is plotted along the abscissa. It will be recognized that the mold breathing begins with the so-called mold decompression starting during the pressure increase, which in the section or phase A illustrates the prevailing change of the mold. In other words, the so-called mold breathing starts when the plastic material injected into the mold compartment 4 has reached a pressure sufficient to oppose the closing force acting upon the mold so that the so-called decompression of the mold occurs. In the following section or phase B the mold halves 1 and 2 are subjected to a bending-through action due to the effects of the pressure of the injection molded material in the hollow mold compartment 4. During phase B there can be detected at the region of the mold compartment 4 a tendency towards forming a mold gap at such region, but such gap is not to be equated to the larger size mold gap which is normally formed at the mold parting or separation plane 3 in the prior art molding systems as previously discussed. Consistent with the foregoing it is to be understood that in the third section or phase C both mold halves 1 and 2 begin to separate, so that now there is formed a mold gap throughout the entire mold separation plane 3.

With heretofore known measurement devices there were measured the changes of the mold gap, and accordingly the measurement magnitude (namely the gap), under the best circumstances, can occur owing to bending-through of both mold halves 1 and 2, i.e. in the phase B.

Figure 2:
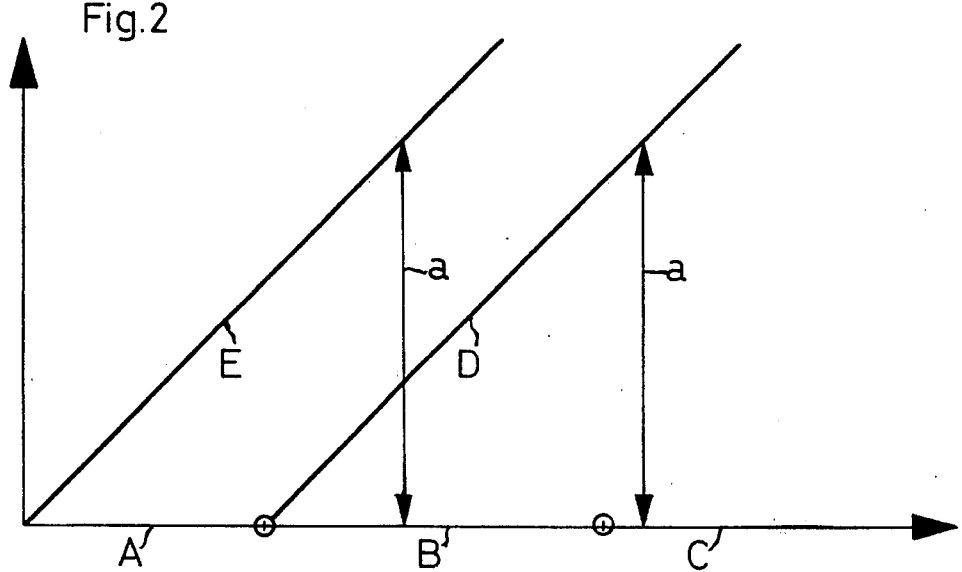
FIG. 2 is a comparative diagram illustrating the course of the measuring signal as a function of the pressure prevailing in the hollow mold compartment with the arrangement according to FIG. 1 and for comparison purposes in a conventional arrangement.

As indicated by the line D of FIG. 2 the bending-through of the mold halves or parts 1 and 2 (phase B) with the prior art systems is not sufficient for receiving from the distance measuring device a signal $a$ adequate to serve as a regulation magnitude, rather for this purpose there is required an actual mold separation (phase C). As experience has shown, even the slightest mold separation leads to the formation of flash or a seam at the molded article, the size of which makes it imperative that there be carried out a post-machining or processing of the molded article.

In contrast with the just discussed workings of the prior art, with the inventive arrangement according to the showing of FIG. 1, the measurement path indicated by reference character $x$ extends up to the coupling or connection location 8 of the distance measuring transmitter 6 with the mold half or part 2, that is to say, from the separation surface 1a of the mold half 1 up to the shoulder 8 forming a contact surface for the transmitter, so that already during the compression of the mold half 2 there occurs a reduction in size of the measurement path $x$ which with corresponding relaxation of the mold, i.e. mold half 2, again returns back to its original size. In other words, when the mold 20 is closed by the closing force the material from which the mold half 2 is formed is compressed, so that there results, as should be readily apparent, a reduction in the size of the measurement path $x$ and upon filling of the molding compartment 4 with the injected plastic material the high pressure of the injection molded-plastic material in the mold compartment 4 opposes the closing force, i.e. mold decompression occurs, so that the previously reduced measurement path $x$ again enlarges to its original magnitude. In fact, the distance measured by the distance measuring transmitter 6 via the intermediate space 13a between its end face 12 and the oppositely situated separation surface 1a of the mold half or part 1, during mold compression, is smaller, as indicated by the value $y1$, than during the relaxation of the mold, as indicated by the distance $y$. Accordingly, the distance measuring transmitter 6 begins to generate measuring signals immediately at the start of the decompression, and which signals —as such has been shown by the line E in FIG. 2— begin to considerably increase still in the section or phase A and attain the magnitude $a$ in the phase B which is sufficient for carrying-out a regulation operation. In certain instances, the signal intensity or magnitude $a$ of the measurement signal can also be smaller, so that already during decompression of the mold alone there is produced a measurement signal which can be evaluated. In any event, however, by making use of the decompression of the mold (phase A) the measurement range is enlarged in such a manner and moved forwardly such that there is not necessary an actual mold separation (phase C) in order to generate a sufficiently pronounced measurement signal. This renders possible an automatic regulation of the degree of filling of the mold, without it being necessary for there to occur the formation of a mold gap. As a result, by utilizing the teachings of the invention it is possible to fabricate injection molded parts which do not exhibit any, or only very little flash, rendering superfluous the removal of flash from the molded product or article or, at the very worst, considerably reducing the time and effort needed to remove such flash. A smaller formation of flash also reduces the wear of the mold. Additionally, in the case of a multi-part mold the thickness tolerances can be held within narrower limits.

Since the intermediate space 13b is formed by a groove which is ground or otherwise machined at the mold half or part 2, and which extends up to the lower marginal region 15 of the mold 20 as shown, in the case of faulty operations the mass of material extending into the intermediate space 13b can escape downwardly and cannot cause any disturbances. In order to insure for the measuring sensitivity of the measuring feeler or sensor the intermediate space 13b is advantageously constructed to be no greater in size, i.e. thickness than one-half of a millimeter. In any event, the intermediate space 13b must be so large in size that the end face 12 of the distance measuring transmitter 6, with maximum compression, at most just contacts the separation surface 1a of the mold half or part 1, without the distance measuring transmitter 6 being lifted-off of the shoulder 8.

During the measurement, i.e. completely automatic regulation of the closing pressure there is only rendered useful as the measurement magnitude the compression, not however the decompression.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A measuring apparatus for a multi-part injection mold for measuring the degree of filling of a hollow mold compartment with injected molding material or the closing pressure of the mold comprising, in combination, a mold defined by at least two mold parts forming therebetween a hollow mold compartment, a distance measuring transmitter arranged in spaced relationship from the hollow mold compartment and having an end face, means for coupling the distance measuring transmitter at a coupling location with one mold part, a surface provided for the other mold part and situated opposite said end face of the distance measuring transmitter, means providing an intermediate space between said end face of the distance measuring transmitter and the oppositely situated surface of said other mold part when the mold is closed, said distance measuring transmitter being responsive to changes of a mold gap formed between said one mold part and the other mold part, said two mold parts being separable from one another at a mold parting plane, said coupling location of the distance measuring transmitter being arranged in spaced relationship from the mold parting plane.

2. The measuring apparatus as defined in claim 1, wherein the coupling means supports the distance measuring transmitter at a contact surface forming the coupling location of the one mold part.

3. The measuring apparatus as defined in claim 2, wherein the contact surface is formed by a shoulder of a bore of the one mold part, said bore receiving said distance measuring transmitter.

4. The measuring apparatus as defined in claim 1, wherein the intermediate space is formed by a recess provided at one of the two mold parts.

5. The measuring apparatus as defined in claim 5, wherein said recess is in the form of a groove extending up to a lower marginal region of the mold.

6. The measuring apparatus as defined in claim 1, wherein the intermediate space is smaller than one-half of a millimeter.

7. The measuring apparatus as defined in claim 1, wherein the distance measuring transmitter is disposed internally of said one mold part and the oppositely situated surface is provided on said other mold part.

8. A measuring apparatus for a multipart injection mold for selectively measuring the degree of filling of a hollow mold compartment with injected molding material or the closing pressure of the mold comprising, in combination, a mold comprising at least two mold parts forming therebetween a hollow mold compartment, a distance measuring transducer arranged in spaced relationship from said hollow mold compartment, means for coupling said distance measuring transducer at a coupling location with one mold part internally thereof, a recess formed in one of the mold parts to provide an intermediate space between an end face of the distance measuring transmitter and an oppositely situated surface of the other mold part when the mold is closed, said distance measuring transducer being responsive to changes in the dimension of said one mold part prior to formation of a mold gap between said one mold part and the other mold part and to changes of said mold gap, said two mold parts being separable from one another at a mold parting plane, said coupling location of the distance measuring transmitter being arranged in spaced relationship from the mold parting plane in order to increase the response sensitivity of the distance measuring transducer.

* * * * *